(12) United States Patent
Kancharla et al.

(10) Patent No.: US 10,374,893 B1
(45) Date of Patent: Aug. 6, 2019

(54) REACTIVE NON-BLOCKING INPUT AND OUTPUT FOR TARGET DEVICE COMMUNICATION

(71) Applicant: Capital One Services, LLC, McLean, VA (US)

(72) Inventors: Gopi Kancharla, Frisco, TX (US); Nicky Joshi, Flower Mound, TX (US); Fredrick Crable, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/173,876

(22) Filed: Oct. 29, 2018

(51) Int. Cl.
*H04L 12/24* (2006.01)

(52) U.S. Cl.
CPC ............................. *H04L 41/0866* (2013.01)

(58) Field of Classification Search
CPC .................................................. H04L 41/0866
See application file for complete search history.

(56) References Cited

U.S. PATENT DOCUMENTS

| | | |
|---|---|---|
| 7,769,683 B1 | 8/2010 | Booker |
| 7,873,568 B1 | 1/2011 | Sappington |
| 2006/0100944 A1 | 5/2006 | Reddin et al. |
| 2008/0262962 A1 | 10/2008 | Alliotts |
| 2008/0301684 A1* | 12/2008 | Barros .................... G06Q 10/06 718/102 |
| 2010/0153262 A1* | 6/2010 | Wirth .................... G06Q 20/042 705/39 |
| 2010/0250426 A1* | 9/2010 | Silva ....................... G06Q 20/04 705/37 |
| 2011/0213752 A1* | 9/2011 | Surtani ............... H04L 67/1095 707/613 |
| 2014/0358765 A1 | 12/2014 | Agius et al. |
| 2015/0379632 A1 | 12/2015 | Michael |

* cited by examiner

*Primary Examiner* — Viet D Vu
(74) *Attorney, Agent, or Firm* — Harrity & Harrity, LLP

(57) ABSTRACT

A device may receive information identifying a plurality of requests and identifying a plurality of targets for the plurality of requests. The device may generate respective routes for the plurality of targets, where a route, of the respective routes, for a target, of the plurality of targets, identifies a set of transformations to be applied to a corresponding request of the plurality of requests. The device may apply the respective routes to the plurality of requests to generate processed requests, and may communicate with at least one of the plurality of targets based on the processed requests. The device may receive results based on communicating with the at least one of the plurality of targets, wherein the results are based on the processed requests, and may provide information based on the results.

20 Claims, 11 Drawing Sheets

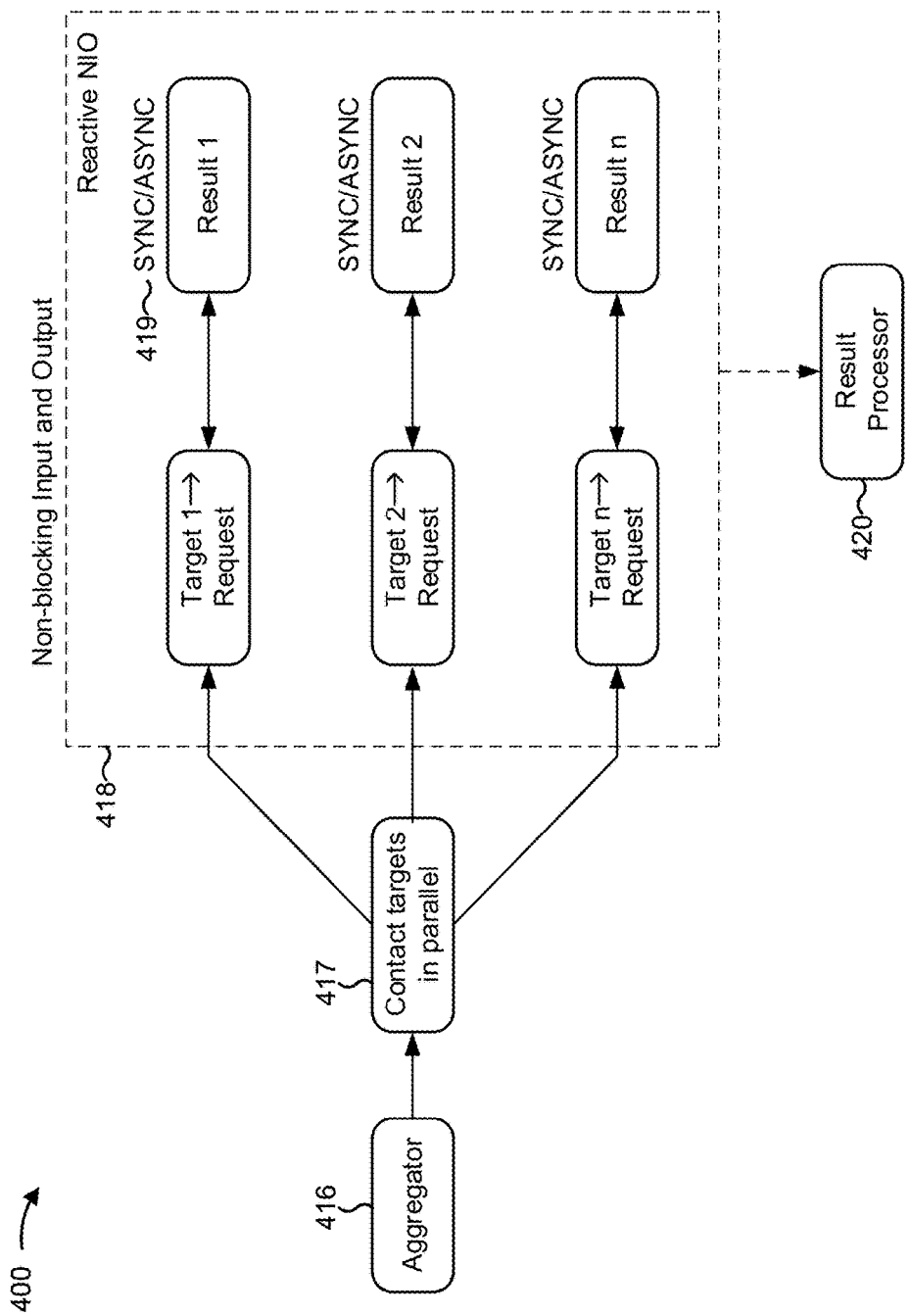

US 10,374,893 B1

REACTIVE NON-BLOCKING INPUT AND OUTPUT FOR TARGET DEVICE COMMUNICATION

BACKGROUND

A user device may be utilized to communicate a common query to multiple different devices in order to determine a result from each of the different devices, such as to determine whether a user of the user device is allowed access to a same or similar service that each of the different devices is associated with. In such a case, the different devices may utilize different configurations, and may thereby require the use of different network addresses, query formats, required parameters, authentication/validation processes, and/or the like.

SUMMARY

According to some possible implementations, a method may include receiving, by a platform, information identifying a plurality of requests, wherein the information identifying the plurality of requests identifies a plurality of targets for the plurality of requests. The method may include determining, by the platform, respective communication configurations for the plurality of targets, and generating, by the platform and based on the respective communication configurations, respective routes for the plurality of targets, wherein a route, of the respective routes, for a target, of the plurality of targets, identifies a set of transformations to be applied to a corresponding request of the plurality of requests. The method may include applying, by the platform, the respective routes to the plurality of requests to generate processed requests, and providing, by the platform, the processed requests to the plurality of targets using a non-blocking input/output (NIO) technique. The method may include receiving, by the platform, results associated with the processed requests using the NIO technique; and providing, by the platform, information based on the results.

According to some possible implementations, a device may include one or more memories, and one or more processors, communicatively coupled to the one or more memories, to receive information identifying a plurality of requests, wherein the information identifying the plurality of requests identifies a plurality of targets for the plurality of requests. The one or more processors may determine respective communication configurations for the plurality of targets, and generate respective routes for the plurality of targets based on the respective communication configurations, wherein a route, of the respective routes, for a target, of the plurality of targets, identifies a set of transformations to be applied to a corresponding request of the plurality of requests. The one or more processors may apply the respective routes to the plurality of requests to generate processed requests, communicate with the plurality of targets based on the processed requests using a reactive non-blocking input/output (NIO) technique to obtain results associated with the processed requests, and provide information based on the results.

According to some possible implementations, a non-transitory computer-readable medium may store instructions that include one or more instructions that, when executed by one or more processors of a device, cause the one or more processors to receive information identifying a plurality of requests, wherein the information identifying the plurality of requests identifies a plurality of targets for the plurality of requests. The one or more instructions may cause the one or more processors to generate respective routes for the plurality of targets, wherein a route, of the respective routes, for a target, of the plurality of targets, identifies a set of transformations to be applied to a corresponding request of the plurality of requests. The one or more instructions may cause the one or more processors to apply the respective routes to the plurality of requests to generate processed requests, and to communicate with at least one of the plurality of targets based on the processed requests. The one or more instructions may cause the one or more processors to receive results based on communicating with the at least one of the plurality of targets, wherein the results are based on the processed requests, and may provide information based on the results.

BRIEF DESCRIPTION OF THE DRAWINGS

FIGS. 4A-4E are diagrams of an example architecture and process flow for an implementation described herein.

DETAILED DESCRIPTION

Figure 1:
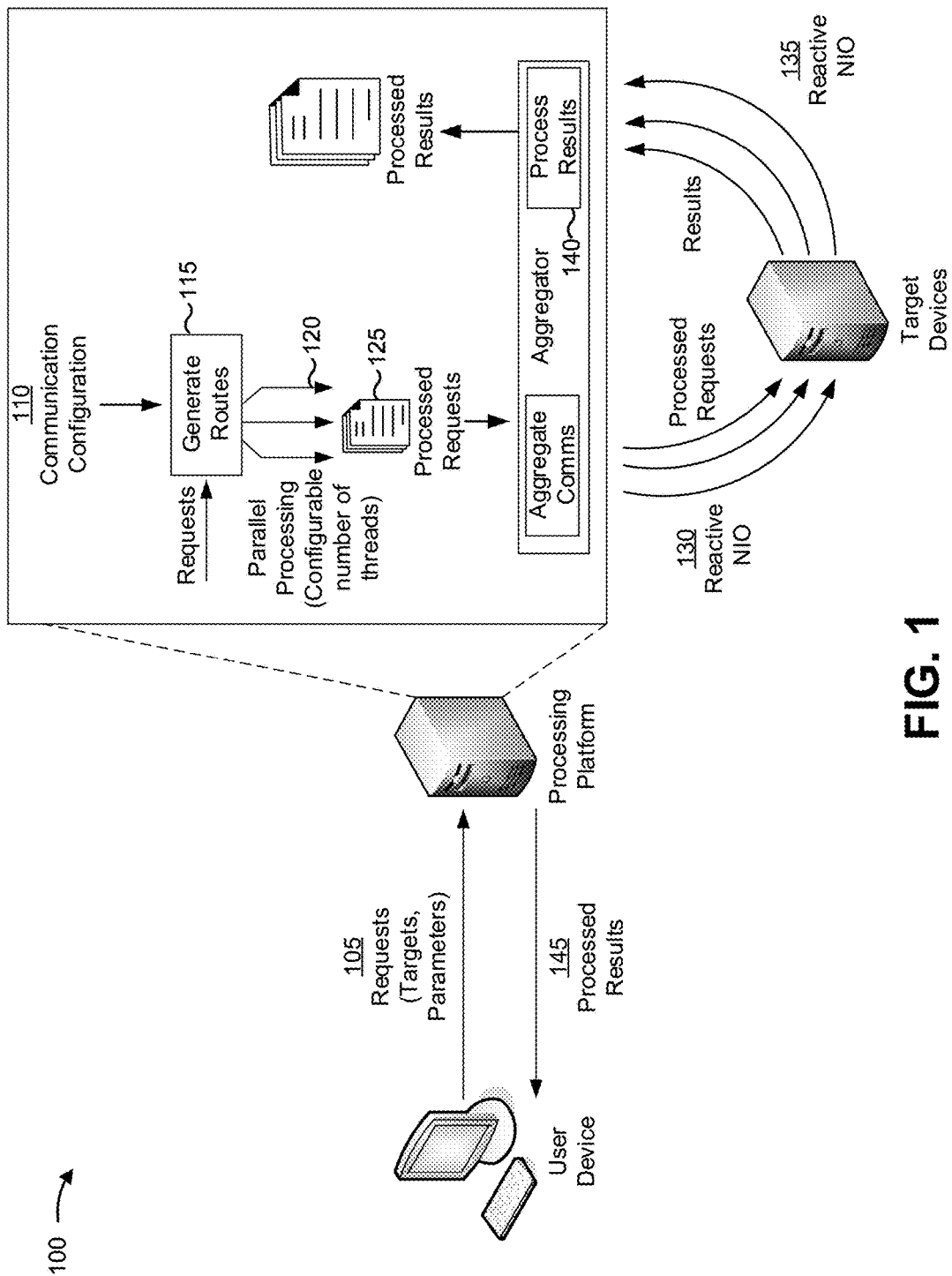
FIG. 1 is a diagram of an example implementation described herein.

The following detailed description of example implementations refers to the accompanying drawings. The same reference numbers in different drawings may identify the same or similar elements.

An entity may provide an interface for communication with the entity. For example, a user device may submit a request identifying a set of parameters to a target device associated with the entity. The target device may determine a result (e.g., a decision regarding whether the client is approved or rejected for a service, terms of the service, etc.) based on the request. One example of such an implementation may be associated with a lender. For example, a client (e.g., a client seeking a loan) may electronically submit a request identifying a set of parameters to a target device associated with the lender. The target device may determine results (e.g., whether the client device is approved, terms of a service to be provided for the client, and/or the like) based on the request and/or set of parameters.

In some cases, a client device may submit requests (e.g., identifying a set of parameters) to multiple, different target devices (e.g., associated with different entities). For example, the client device may submit the requests to determine a set of entities that approve the request, a set of entities that deny the request, terms of services for the entities that approved the request, and/or the like. Parallel processing may be useful for providing the requests in a timely fashion. However, different target devices may be associated with different configurations for the query. For example, different target devices may be associated with different network addresses, query formatting, required parameters, authentication/validation configurations, communication configurations, and/or the like. Furthermore, different target devices may be associated with different latencies, round trip times, processing times, and/or the like, which may lead to blocking or occupation of threads while waiting for a response from a slow target device. Still further, in some cases, a request may fail or may encounter an error (e.g., may be undeliverable, may be improperly formatted or configured, may be subject to a target-device-side issue, and/or the like). It may be useful to determine why the failure occurred without blocking other communication with target devices by the client device.

Implementations described herein may provide a processing platform that performs efficient communication with a plurality of target devices using reactive non-blocking input/output (NIO). For example, the processing platform may provide requests and may receive results associated with the requests using a reactive NIO technique in parallel, which reduces the amount of time and resources that would otherwise be used for occupying a thread or port while waiting for a response. Furthermore, some implementations described herein may perform processing of requests (e.g., to generate processed requests) using a parallel processing technique with a configurable thread allocation, which improves flexibility and efficiency of thread allocation for the processing of requests. Still further, some implementations described herein may provide an aggregator to handle communication between the processing platform and the plurality of target devices (e.g., transmissions to the target devices and reception from the target devices based on reactive NIO), which simplifies communication with the target devices, enables the use of the reactive NIO, and improves efficiency of interacting with different target devices.

In this way, the processing platform may enable communication with a large number of target devices based on large numbers of requests. For example, by using reactive NIO and configurable threaded processing, the processing platform may enable communication on a scale impossible for a human actor and/or using blocking IO techniques. Notably, the implementations described herein may scale for thousands, tens of thousands, or hundreds of thousands of requests and/or target devices in a short time period (e.g., thousands of requests or target devices per minute, thousands of requests or target devices per second, etc.).

FIG. 1 is a diagram of an example implementation 100 described herein. As shown in FIG. 1, and by reference number 105, a processing platform may receive one or more requests from a user device. A request may be associated with information identifying a target for the request and/or one or more parameters associated with the request. In some implementations, the request may be a request for pricing for a loan, such as an automotive loan, a mortgage, and/or the like. In such a case, the target may be a lender, a bank, an underwriter, and/or the like. In some implementations, the request may indicate a target based on an identifier associated with the target (e.g., an entity identifier, a lender identifier, a network address, and/or the like). In some implementations, the request may indicate a target based on an interaction with a user interface (e.g., based on a user interaction to select the target from a set of available targets). In some implementations, the request may not explicitly identify a target. For example, the request may be associated with a set of targets (e.g., a predefined list of targets known to the processing platform), which may reduce a size of the request, thereby conserving network resources. The processing platform may identify the targets based on the list of targets. In some implementations, the processing platform may automatically select a target (e.g., based on one or more parameters of the request, based on the user device from which the request is received, and/or the like), which may conserve processor resources of the user device that would otherwise be used to select or identify the target.

As further shown, the request may be associated with one or more parameters. A parameter may include information to be used to determine a result for the request. For example, a target device may use the parameters associated with the request to determine a result. As an example, the target device may determine whether a loan is to be provided in connection with the request and/or may determine terms of the loan. In some implementations, a parameter may include user information (e.g., a user identifier, account information, a personal identifier, etc.), information identifying a subject of the request (e.g., collateral, a vehicle, a principal amount associated with the request, etc.), and/or the like. When the request relates to an automobile loan, the parameters may identify vehicle information, a finance structure for the loan, prequalification information (e.g., credit score, credit history, etc.), loan information (e.g., term, acceptable interest rate, etc.), and/or the like.

In some implementations, the request may be associated with authentication and/or validation information. The processing platform may authenticate and/or validate the user device based on the request. For example, the processing platform may determine whether the authentication and/or validation information is authentic, whether the request is valid, whether an authentication procedure of a target device is satisfied by the authentication and/or validation information, and/or the like. In some implementations, the processing platform may perform the authentication and/or validation based on a client configuration database, as described in more detail elsewhere herein. In some implementations, the processing platform may perform this authentication and/or validation for each target identified by the request based on the respective authentication and/or validation procedures of each target. When authentication or validation fails for a particular target, the processing platform may provide an indication of a reason for the failure. For example, the processing platform may determine the reason for the failure based on feedback from the particular target, based on a communication configuration of the particular target, and/or the like. In this way, the processing platform improves security of communication with the targets and efficiency of authentication and/or validation of the requests. By performing the authentication and/or validation automatically (e.g., for each target identified by the request), the processing platform may conserve resources of the user device that would be used to individually authenticate and/or validate with regard to each target based on configuring a respective request for each target in accordance with each target's authentication and/or validation procedures.

As shown by reference number 110, the processing platform may be associated with (e.g., store, have access to, receive, obtain, etc.) information identifying one or more communication configurations. A communication configuration may identify a configuration or preferences for communicating with a target device. For example, a communication configuration may indicate formatting for a request, authentication/validation procedures or requirements, a communication protocol, proxy settings, a logical structure of an endpoint, a transformation to be applied to a target identifier (e.g., to transform the target identifier to a network address and/or the like), a payload transformation to be applied for a payload of the request, a transformation to be applied for a response or result associated with the request, and/or the like.

In some implementations, a communication configuration may identify an address transformation for an identifier associated with a request. For example, a request may be associated with an identifier for the processing platform. Different targets may use different identifiers or different formats for identifiers. The communication configuration may identify an identifier or a format for an identifier to be used for a corresponding target device. The processing platform may process an identifier associated with the request to generate an identifier for the corresponding target device based on the communication configuration (e.g., based on a route determined using the communication configuration), as described in more detail below.

In some implementations, each target may be associated with a respective communication configuration. For example, different targets may be associated with different formatting, procedures, requirements, communication protocols, and so on. It may be cumbersome for an individual to conform with the respective communication configurations of the different targets. Furthermore, these communication configurations might change over time. It may also be cumbersome for an individual to track these changes and ensure that requests to different lenders are generated using up-to-date communication configurations. The processing platform may store or have access to communication configurations that can be updated based on changing requirements of a target. In some implementations, the processing platform may automatically update a communication configuration, or may automatically obtain an up-to-date communication. By maintaining, applying, and updating the different communication configurations, the processing platform conserves processor resources that would otherwise be used to maintain and apply the different communication configurations in a decentralized fashion (e.g., at the user devices) and reduces errors or failures based on application of an outdated or inaccurate communication configuration.

As shown by reference number 115, the processing platform may generate routes based on the requests and the communication configuration. A route may identify one or more operations or transformations to be performed with regard to a request to prepare the request for communication with a target device. For example, the route may identify operations that are indicated by the communication configuration corresponding to the target device. The processing platform may process the request based on a route corresponding to a target device for the request, which may be referred to herein as performing a route. In some implementations, the processing platform may generate the routes at runtime based on the communication configurations corresponding to the requests. The processing of the routes is described in more detail in connection with reference number 120, below.

In some implementations, a route may identify a set of transformations to be performed for a request to generate a processed request. For example, different target devices may use different formats, payloads, network addresses, identifier formats, validation/authentication techniques, and/or the like. When performing a transformation, the processing platform may transform a request so that the request conforms with a requirement of a target device. In some implementations, a transformer (e.g., a component that performs the transformation) may include a uniform resource locator (URL) transformer. For example, the URL transformer may transform a URL identified by the request to a URL associated with a target device to facilitate transmission of the request to the target device. In some implementations, a transformer may include a payload transformer. A payload transformer may transform a payload of a request (e.g., a file format of the payload, a header of the payload, one or more values included in the payload, etc.) to a format associated with a target device.

In some implementations, a route may indicate one or more operations to be performed to process a result. For example, different results may be associated with different formats, different communication protocols, different payloads, and/or the like. Furthermore, a result may indicate a status of a request, such as acceptance of a request (e.g., a loan is to be provided), denial of a request (e.g., a loan is not to be provided), an error, and/or the like. In some implementations, a route may indicate an operation to perform with regard to an attribute of a result, such as a format, communication protocol, payload, and/or the like. In such a case, the processing platform may reformat the result or a payload of the result, may use a communication protocol indicated by the route, and/or the like. This may improve uniformity of results, thereby reducing errors or incompatibility associated with the user device. In some implementations, the processing platform may aggregate multiple results for the user device, which may conserve processor and network resources that would otherwise be used to provide individual, unaggregated results to the user device.

In some implementations, the processing platform may determine the status of a request based on a route. For example, the processing platform may determine that a request has failed, may determine a cause of the failure, may determine whether a request should be resubmitted, may determine that a request is successful (e.g., that a request was successfully received and processed by the target device), may determine that a request was accepted or denied, may determine a reason why the request was accepted or denied, and/or the like.

As shown by reference number 120, the processing platform may perform parallel processing based on the routes. The processing platform may perform the routes in parallel. For example, the processing platform may perform the routes asynchronously, on the fly, using a non-blocking technique, and/or the like. In some implementations, the processing platform may perform one or more routes contemporaneously with a communication with a target device. For example, the processing platform may process a request for a first target device while a processed request is provided to a second target device, or while a communication is received from the second target device.

In some implementations, the processing platform may perform the routes using threads (e.g., processing threads). In some implementations, the number of threads may be configurable. For example, the processing platform (or an administrator associated with the processing platform) may configure a particular number of threads for a particular route, for a set of routes, for a particular request, for a particular target, and/or the like. In some implementations, the processing platform may dynamically configure the number of threads (e.g., based on a number of requests to be processed, based on a status of a route, based on how many routes are to be processed in parallel, based on which operation of a route is to be performed, and/or the like). The usage of multiple configurable threads may improve the flexibility of request processing and may reduce resource usage associated with inefficient allocation of threads for request processing.

In some implementations, a route may be divided into multiple work units (e.g., chunks, segments, etc.). The division of the route into multiple work units may enable the parallel and/or asynchronous processing of multiple routes. For example, the processing platform may process work units using any available thread (e.g., any thread that is configured for the work unit or a route associated with the work unit). When a route for a particular target device on a thread has paused or stalled (e.g., based on waiting for a response, etc.), the processing platform may perform work units for other routes using the thread. In this way, asynchronous or parallel processing of the work units of routes is enabled, thereby reducing the delay associated with processing requests for multiple different target devices.

As shown by reference number 125, the processing platform may generate processed requests based on the parallel processing. As further shown, an aggregator of the processing platform may aggregate the processed requests for provision to the target devices. For example, the processing platform may aggregate a set of processed requests to be transmitted to respective target devices. A processed request may be a communication that has been processed in accordance with a communication configuration for a corresponding target device. For example, a processed request may have a uniform resource locator (URL), security information (e.g., for authentication and/or validation), a payload, and/or an identifier that conform with the communication configuration for the corresponding target device. By aggregating the set of processed requests, the processing platform may enable the concurrent transmission and reception of the processed requests (e.g., using a reactive NIO technique), as described in more detail below.

In some implementations, the processing platform may perform the operations identified by the routes using volatile memory. By performing the operations identified by the routes using volatile memory, overhead may be reduced and performance may be improved in comparison to using non-volatile memory. Furthermore, using volatile memory may reduce the amount of time needed to provide a processed result based on a query (e.g., a query from a user device or from an aggregator of the processing platform), which improves performance of the processing platform and reduces delay associated with querying for processed results.

As shown by reference number 130, the processing platform (e.g., the aggregator) may provide the processed requests using a reactive NIO technique. For example, the processing platform may provide the processed requests using multiple threads. Some target devices may be associated with different configurations or response times than other target devices. Therefore, it may be inefficient to block a thread while communicating with a target device until a response is received on the thread. To prevent resource waste based on occupying a thread while waiting for a response, the processing platform may use a reactive NIO technique. The reactive NIO technique may dynamically allocate threads for input and output as the threads are needed. In this way, performance and utilization of system resources are improved relative to using a blocking IO system.

In some implementations, the processing platform may use a synchronous reactive NIO configuration. When using the synchronous reactive NIO configuration, the processing platform may transmit the processed requests and receive the results using synchronous calls without blocking threads (e.g., wherein a thread is reallocated for other use between transmitting the processed request and receiving the result, and wherein operations of a route or a set of routes are performed in a predefined order). In some implementations, the processing platform may use an asynchronous reactive NIO technique. When using the asynchronous reactive NIO configuration, the processing platform may transmit the processed requests and receive the results using asynchronous calls without blocking threads (e.g., wherein a thread is reallocated for other use between transmitting the processed request and receiving the result, and wherein operations of a route or a set of routes can possibly be performed in any order).

As shown by reference number 135, the processing platform (e.g., the aggregator) may receive results based on providing the processed requests. For example, the target devices may determine results based on the processed requests. A result may indicate whether a request was accepted or denied by the target device, may identify terms associated with the result (e.g., terms of a loan, such as principal, collateral, and/or the like), may identify an error state associated with the request, and/or the like. In some implementations, different results may have different formats. For example, a first target device may provide a result in a different format (e.g., with a different identifier, with a differently-formatted payload, using a different communication protocol, etc.) than a second target device. By aggregating the results, the processing platform conserves network resources and reduces overhead associated with individually receiving and forwarding multiple, different results to the user device.

In some implementations, the processing platform may determine an error handling technique based on a result. For example, the processing platform may determine the error handling technique based on a communication configuration and/or based on information included in the result. In some implementations, the processing platform may determine that a request is to be retransmitted, may determine that a request is to be formatted differently, may determine that a request is to be retransmitted after a delay, may determine that a size of a request is to be reduced, may determine an updated network address or communication configuration based on the request, and/or the like. In some implementations, the processing platform may perform the error handling technique. For example, the processing platform may automatically perform the error handling technique, or may perform the error handling technique based on a user input. In this way, the processing platform may gracefully handle errors in communication with target devices, thereby improving efficiency and reducing downtime and unusable results associated with such errors.

As shown by reference number 140, the processing platform (e.g., the aggregator) may process the results and may thereby generate processed results. For example, the processing platform may perform one or more processing operations indicated by routes or transformations corresponding to the results to generate the processed results. In some implementations, the processing platform may store or provide information based on the processed results. For example, the processing platform may provide information indicating a status of each processed result (e.g., accepted, denied, error, etc.). As another example, the processing platform may generate a shell that indicates the status of each processed result.

As shown by reference number 145, the processing platform may provide the processed results to the user device. For example, the processed results may indicate whether the request was accepted or denied with regard to each target device, an offer associated with an accepted request, terms of the offer associated with the accepted request, and/or the like. In some implementations, the processed results may indicate that an error has occurred with regard to a request, may identify a reason associated with the error, and/or the like. In some implementations, the processing platform may provide the processed results using a standardized format. For example, the processing platform may provide values of different processed results using the same or a similar format, irrespective of formatting of the results associated with the different processed results. This may improve uniformity of results, thereby improving user experience in comparison to parsing differently-formatted results. Furthermore, standardizing the results may improve reliability of providing the processed results. For example, it may be easier to ensure proper formatting and display of standardized processed results in comparison to results that are associated with different formatting, communication protocols, and/or the like.

In some implementations, the processing platform may provide the processed results via a user interface. For example, the processing platform may provide the processed results for display to a user associated with the user device. In some implementations, the processing platform may provide a processed result based on a request for the processed result. For example, the processing platform may receive the request from a user device, and may provide the corresponding processed result or information associated with the processed result (e.g., information indicating acceptance, rejection, an error, etc.). Thus, the processing platform may provide real-time access to processed results based on a request, thereby reducing overhead and network resource usage associated with providing all processed results simultaneously.

As indicated above, FIG. 1 is provided as an example. Other examples are possible and may differ from what was described with regard to FIG. 1.

Figure 2:
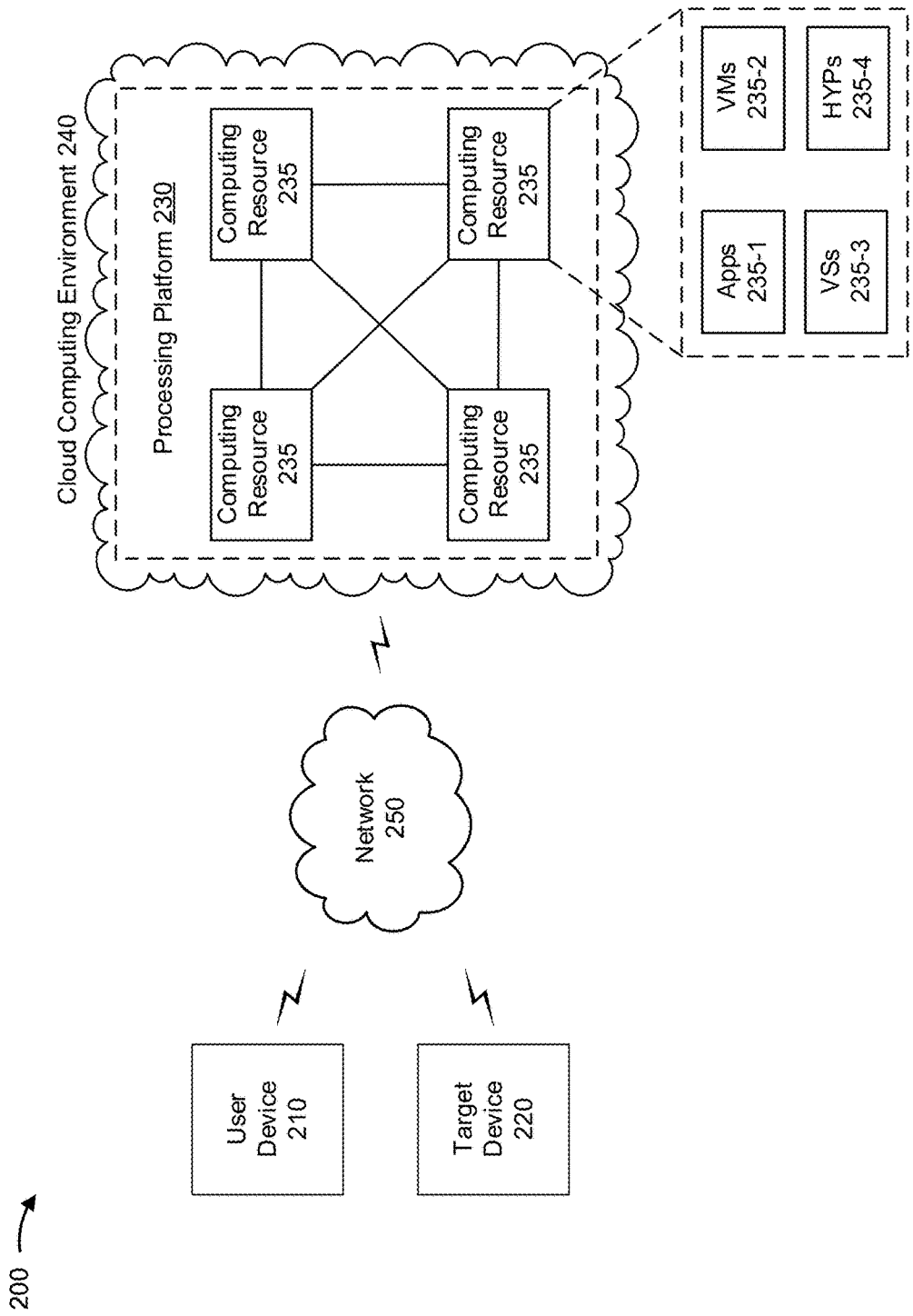
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a target device 220, a processing platform 230 that includes computing resources 235 in a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with reactive non-blocking input and output (NIO) for target device communication. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may provide requests to processing platform 230 and may receive processed results from processing platform 230.

Target device 220 includes one or more devices capable of receiving, storing, providing, generating, and/or processing information associated with reactive non-blocking input and output (NIO) for target device communication. For example, target device 220 may include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, target device 220 may receive processed requests from processing platform 230 (e.g., using a reactive NIO technique), and may provide results (e.g., based on the processed requests) to processing platform 230.

Processing platform 230 includes one or more computing resources assigned to perform reactive non-blocking input and output (NIO) for target device communication. For example, processing platform 230 may be a platform implemented by cloud computing environment 240 that may receive requests from user device 210, generate routes based on the requests and communication configurations, generate processed requests based on the routes, provide processed requests to target devices 220, receive results from target devices 220, process the results, and provide the processed results to user device 210. In some implementations, processing platform 230 is implemented by computing resources 235 of cloud computing environment 240.

Processing platform 230 may include a server device or a group of server devices. In some implementations, processing platform 230 may be hosted in cloud computing environment 240. Notably, while implementations described herein describe processing platform 230 as being hosted in cloud computing environment 240, in some implementations, processing platform 230 may not be cloud-based or may be partially cloud-based.

Cloud computing environment 240 includes an environment that delivers computing as a service, whereby shared resources, services, etc. may be provided to perform reactive non-blocking input and output (NIO) for target device communication. Cloud computing environment 240 may provide computation, software, data access, storage, and/or other services that do not require end-user knowledge of a physical location and configuration of a system and/or a device that delivers the services. As shown, cloud computing environment 240 may include processing platform 230 and computing resources 235.

Computing resource 235 includes one or more personal computers, workstation computers, server devices, or another type of computation and/or communication device. In some implementations, computing resource 235 may host processing platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with processing platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
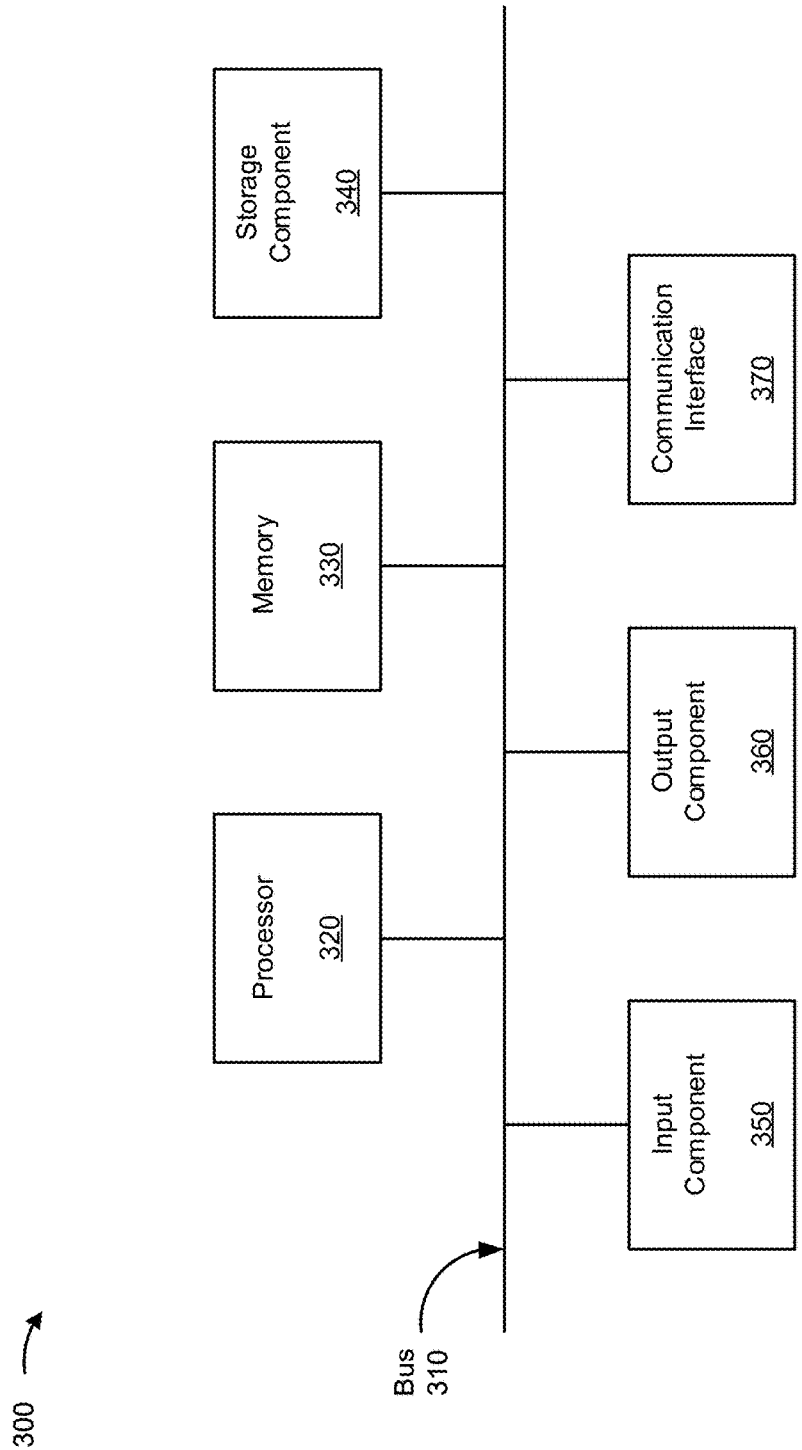
FIG. 3 is a diagram of example components of one or more devices of FIG. 2.

FIG. 3 is a diagram of example components of a device 300. Device 300 may correspond to user device 210, target device 220, processing platform 230, and/or computing resources 235. In some implementations, user device 210, target device 220, processing platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4E are diagrams of an example architecture 400 and process flow for an implementation described herein. The operations described in connection with FIGS. 4A-4E may be performed by one or more of the components of the device 300 described in connection with FIG. 3, above.

Figure 4A:
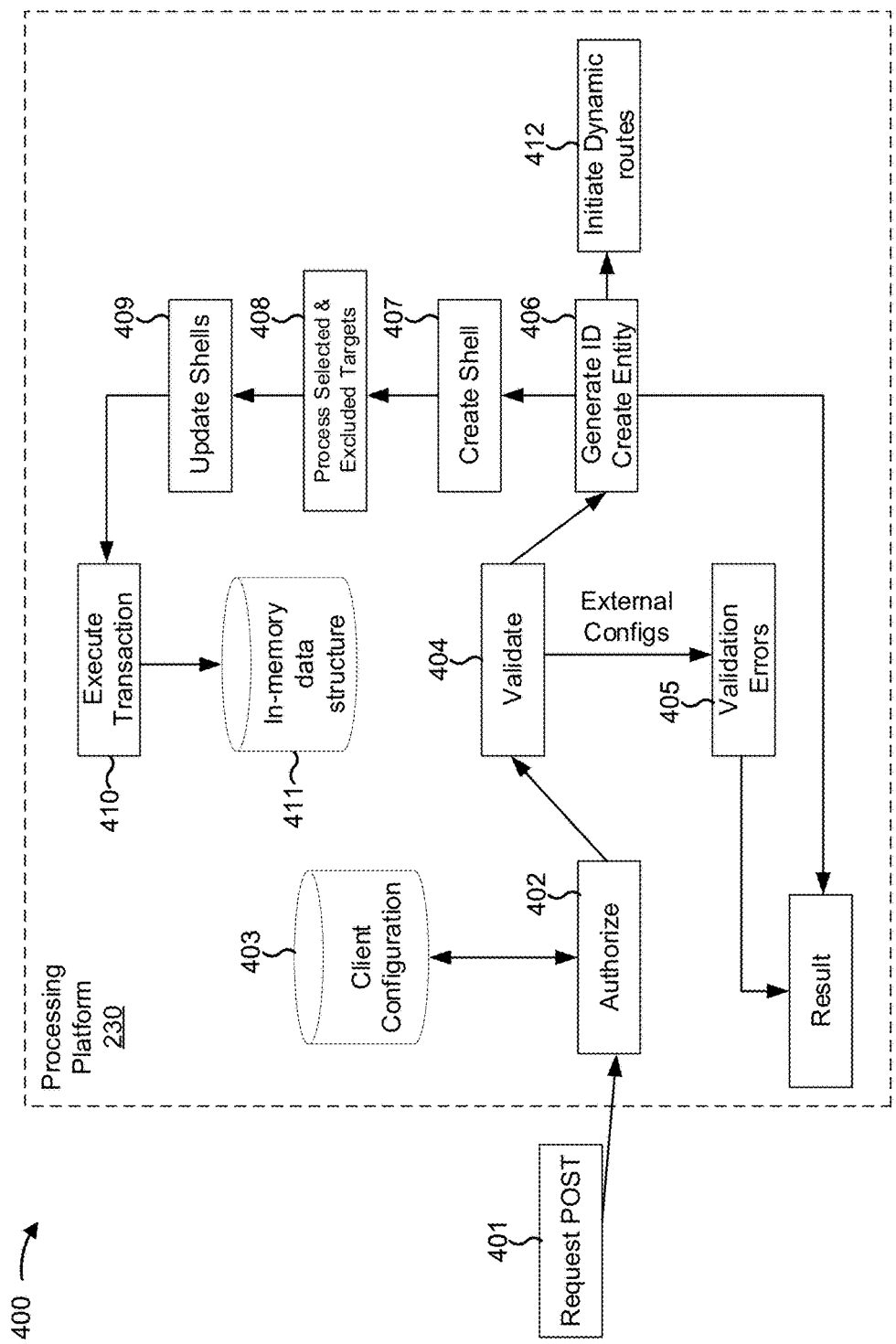

As shown in FIG. 4A, and by reference number 401, a processing platform 230 may receive a request (shown here as request POST). As shown by reference number 402, processing platform 230 may perform an authentication operation with regard to the request. For example, processing platform 230 may perform the authentication based on a client configuration database, shown by reference number 403. As shown by reference number 404, processing platform 230 may perform a validation operation, such as validating the request and/or a framework associated with the request. As shown by reference number 405, if the validation is unsuccessful (e.g., if there is a validation error), then processing platform 230 may provide a result indicating that the validation was erroneous. For example, the result may indicate a reason for the error (e.g., database connection error, validation error, etc.). In some implementations, the result associated with the error may be provided as validation is performed (e.g., instantaneously), which may allow the user device to rectify the error.

As shown by reference number 406, if the validation and authentication are successful, then processing platform 230 may generate an identifier for the request, and may create an entity for the request. The entity may be an object that holds parameters or details associated with the request. The identifier may be an identifier for the request (e.g., a unique identifier, an identifier generated based on the request, and/or the like). In some aspects, processing platform 230 may provide the identifier (e.g., to a user device associated with the request). For example, the user device may request a status of the request based on the identifier, as described in more detail elsewhere herein.

As shown by reference number 407, processing platform 230 may generate shells for the request. For example, processing platform 230 may generate a respective shell for each target or target device (e.g., target device 220) associated with the request. A shell may indicate the status of a request, and may be updated as the request is processed and as a result is obtained based on the request. In some implementations, a shell may be associated with the identifier for the request. For example, processing platform 230 may provide access to the status of the request based on the identifier and/or based on an authentication/validation procedure.

As shown by reference number 408, processing platform 230 may process selected and/or excluded targets. A selected target is a target to which the request is to be transmitted. For example, a selected target may be identified by the request or by processing platform 230. An excluded target may be a target to which a request is not to be provided. For example, processing platform 230 may determine that a target is invalid, that a target has preemptively declined the request, that a target is associated with a rule that indicates not to provide the request to the target, and/or the like. As shown by reference number 409, processing platform 230 may update the shells. For example, processing platform 230 may remove or modify shells associated with excluded targets, may set an expiration time for the shells, may populate a shell with information indicating the status of a request, and/or the like.

As shown by reference number 410, processing platform 230 may perform a transaction with an in-memory data structure 411. For example, processing platform 230 may store the shells in the in-memory data structure. This may conserve resources and reduce overhead in comparison to using longer-term storage since the shells are likely to be updated and/or accessed multiple times. In some implementations, the in-memory data structure 411 may include, for example, a database, a cache, and/or the like. As one example, the in-memory data structure 411 may use a remote dictionary server (REDIS) distribution.

As shown by reference number 412, processing platform 230 may initiate routes for the request. For example, processing platform 230 may generate the routes. Here, the routes are shown as dynamic routes, indicating that the routes may be generated at runtime based on a communication configuration, as described in more detail elsewhere herein. In some implementations, processing platform 230 may apply a route with regard to each target that is to receive the request. For example, processing platform 230 may split the request into multiple parallel asynchronous routes in order to establish communication with the targets.

Figure 4B:
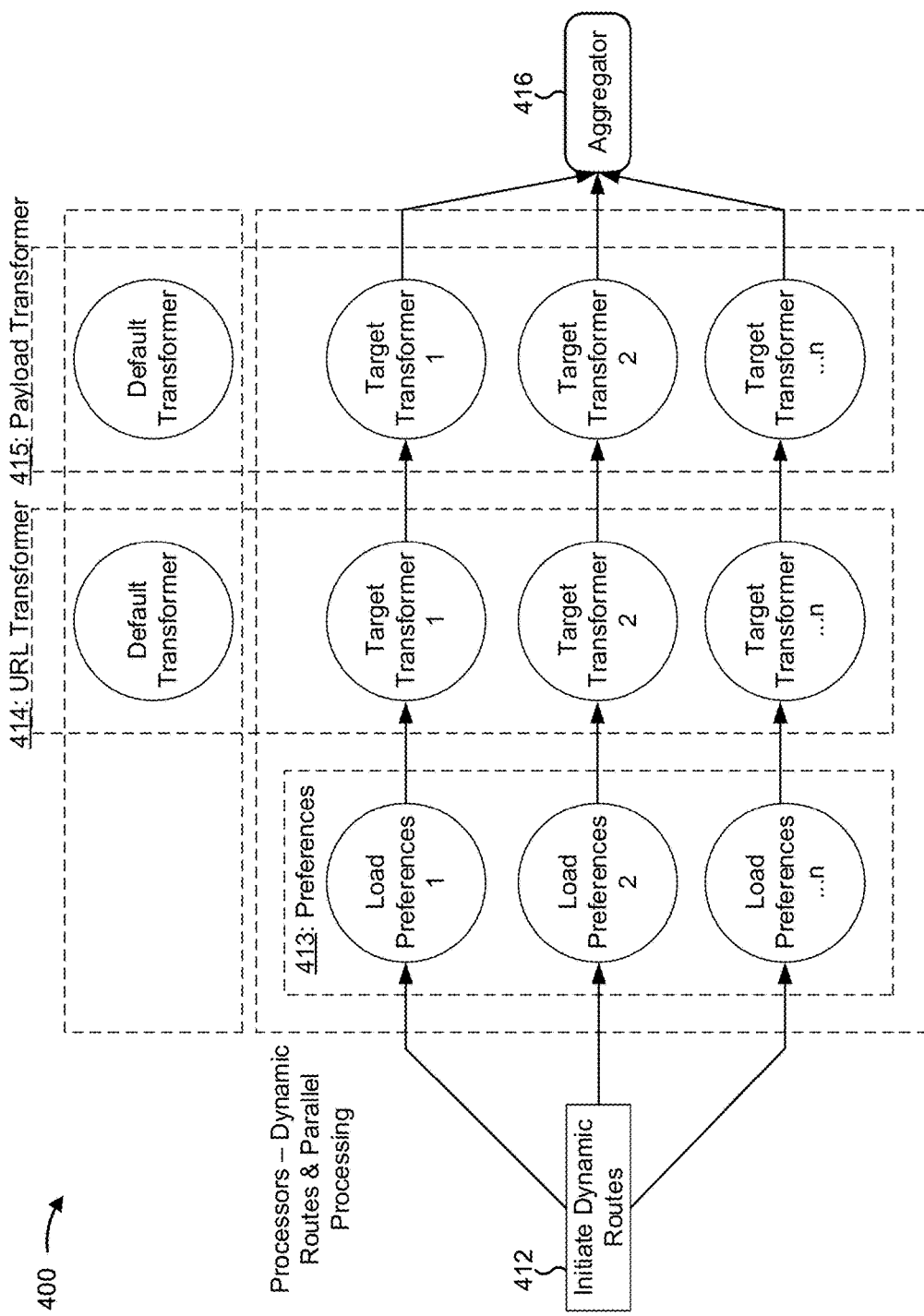

The operations described in connection with FIG. 4B may be performed by processing platform 230 (e.g., one or more components of processing platform 230). As shown in FIG. 4B, processing platform 230 may apply the routes to the request (e.g., may perform the operations indicated by the routes). For example, as shown by reference number 413, processing platform 230 may load preferences associated with a set of targets 1 through N, wherein the targets 1 through N include the targets for the request. In some implementations, processing platform 230 may load the preferences based on communication configurations for the set of targets 1 through N. In some implementations, processing platform 230 may configure or preconfigure a communication channel associated with a route based on the corresponding preferences. For example, processing platform 230 may configure a timeout setting, an authentication configuration, a proxy setting, and/or the like.

As shown by reference number 414, processing platform 230 may apply a URL transformer to the request for the targets 1 through N. For example, processing platform 230 may associate each route with a URL for a corresponding target, may identify a URL for the corresponding target as part of the route, or may replace a URL or identifier of the request with a URL for the corresponding target. As shown by reference number 415, processing platform 230 may apply a payload transformer for each route. In some implementations, when a URL transformer or payload transformer is not identified by the communication configuration, processing platform 230 may use a default URL transformer or payload transformer, as shown at the top of FIG. 4B.

As shown by reference number 416, processing platform 230 (e.g., an aggregator of processing platform 230) may aggregate processed results generated using the routes upon completion of the routes. For example, processing platform 230 may prepare the processed results for simultaneous provision to respective target devices (e.g., target device 220). In some implementations, a route may be associated with a timeout setting. If the route is not completed upon expiration of the timeout, processing platform 230 may return an error, may determine a reason for the timeout, and/or the like. In some implementations, processing platform 230 may load the aggregator (e.g., before completion of the routes). In some implementations, processing platform 230 may generate or inject a handler to handle results and/or errors from lenders.

The operations described in connection with FIG. 4C may be performed by processing platform 230 (e.g., one or more components of processing platform 230). As shown in FIG. 4C, and by reference number 417, processing platform 230 (e.g., the aggregator) may provide the processed requests to the plurality of targets. For example, processing platform 230 may provide the processed results to the targets in parallel. As shown by reference number 418, processing platform 230 may contact the targets using a reactive NIO technique. As shown by reference number 419, the reactive NIO technique can be performed synchronously or asynchronously for each request (e.g., all requests can be handled asynchronously, some requests can be handled asynchronously and other can be handled synchronously, all requests can be handled synchronously, etc.). As shown by reference number 420, processing platform 230 may receive results corresponding to the requests, and may provide the results to a result processor. The result processor may determine a status of a result (e.g., accepted/successful/approved, denied/failure/unsuccessful, error, etc.). In some implementations, there may be multiple, different result processors, such as one for each route, one for each request, one for each target, two or more result processors, and/or the like.

Figure 4D:
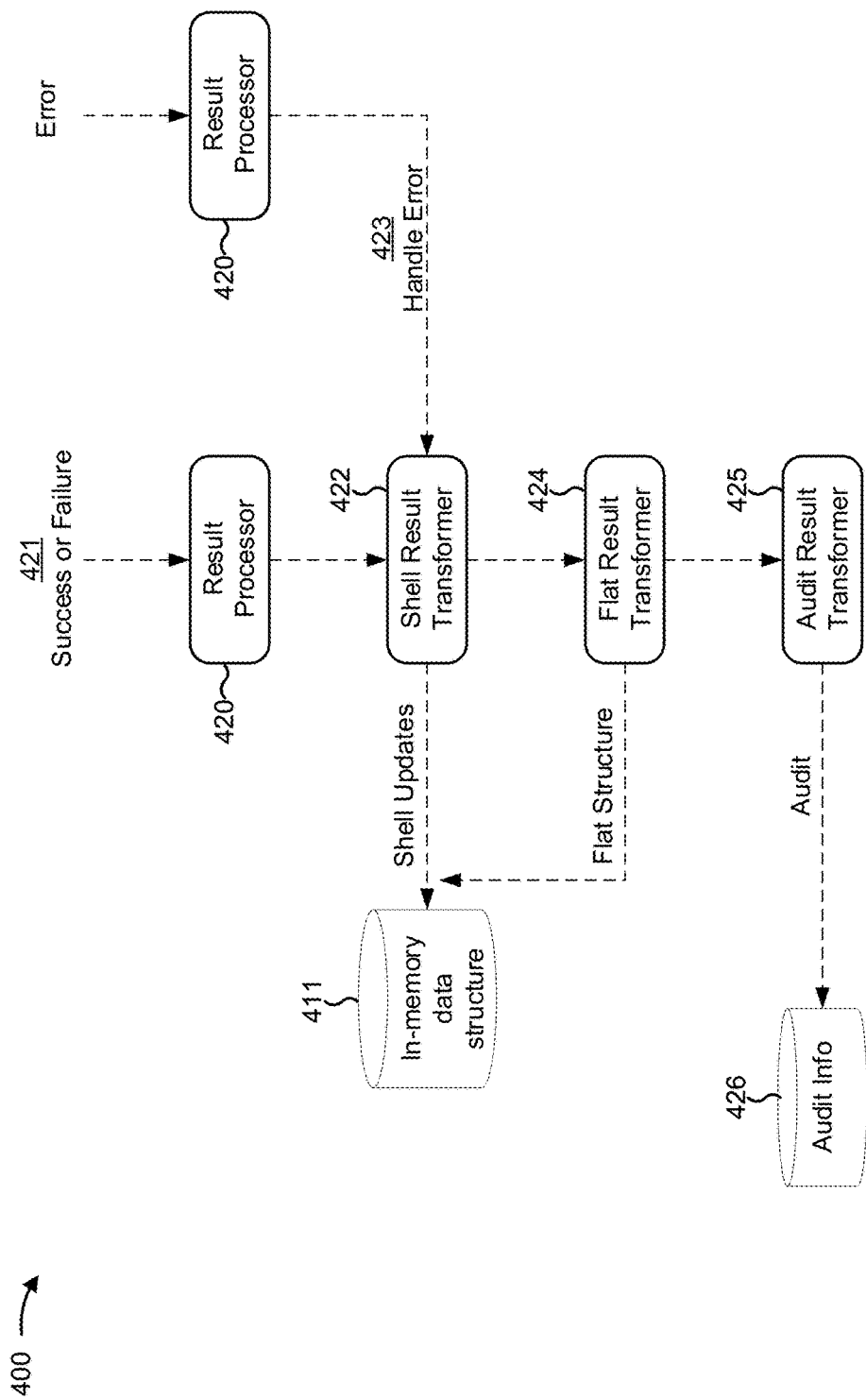

The operations described in connection with FIG. 4D may be performed by processing platform 230 (e.g., one or more components of processing platform 230). As shown in FIG. 4D, and by reference number 421, when a result indicates a success or a failure, the result processor may provide the result to a shell result transformer, shown by reference number 422. As shown by reference number 423, when the result indicates an error, the result processor (e.g., a handler associated with the result processor, etc.) may perform error handling. For example, the error handling may indicate a cause of the error, a fix for the error, and/or the like. After performing error handling, the result processor may provide the result and information associated with the error to the shell result transformer.

The shell result transformer may determine an update for a shell based on a result. For example, the shell result transformer may determine that a shell is to be updated to indicate a successful request, a failed request, an error associated with a request, parameters associated with a successful or failed request, a reason for the request, and/or the like. As shown by reference number 424, in some implementations, the shell result transformer may provide a result to be flattened. For example, the flat result transformer may process a result to strip formatting, to remove links, and/or the like. As further shown, the flat result transformer may provide a result, with a flat structure, for a shell update. As shown, the shell updates may be applied with regard to the in-memory data structure shown by reference number 403. For example, the shell updates may be applied with regard to the shells that were generated in connection with reference numbers 407 and 409 of FIG. 4A. Thus, shells for a request may be dynamically updated, thereby As shown by reference number 425, in some cases, a flat result transformer (or a shell result transformer, a result processor, an aggregator, and/or the like) may provide a result to an audit result transformer. The audit result transformer may determine (e.g., extract) and/or provide information associated with the result (e.g., performance metrics, security information, an identity of the user device, identities of the targets, resource usage, and/or the like) for storage by an audit information database, shown by reference number 426. Processing platform 230 may provide access to the audit information database (e.g., based on an authentication/validation procedure, as described elsewhere herein). Thus, auditing of processing platform 230 may be facilitated.

Figure 4E:
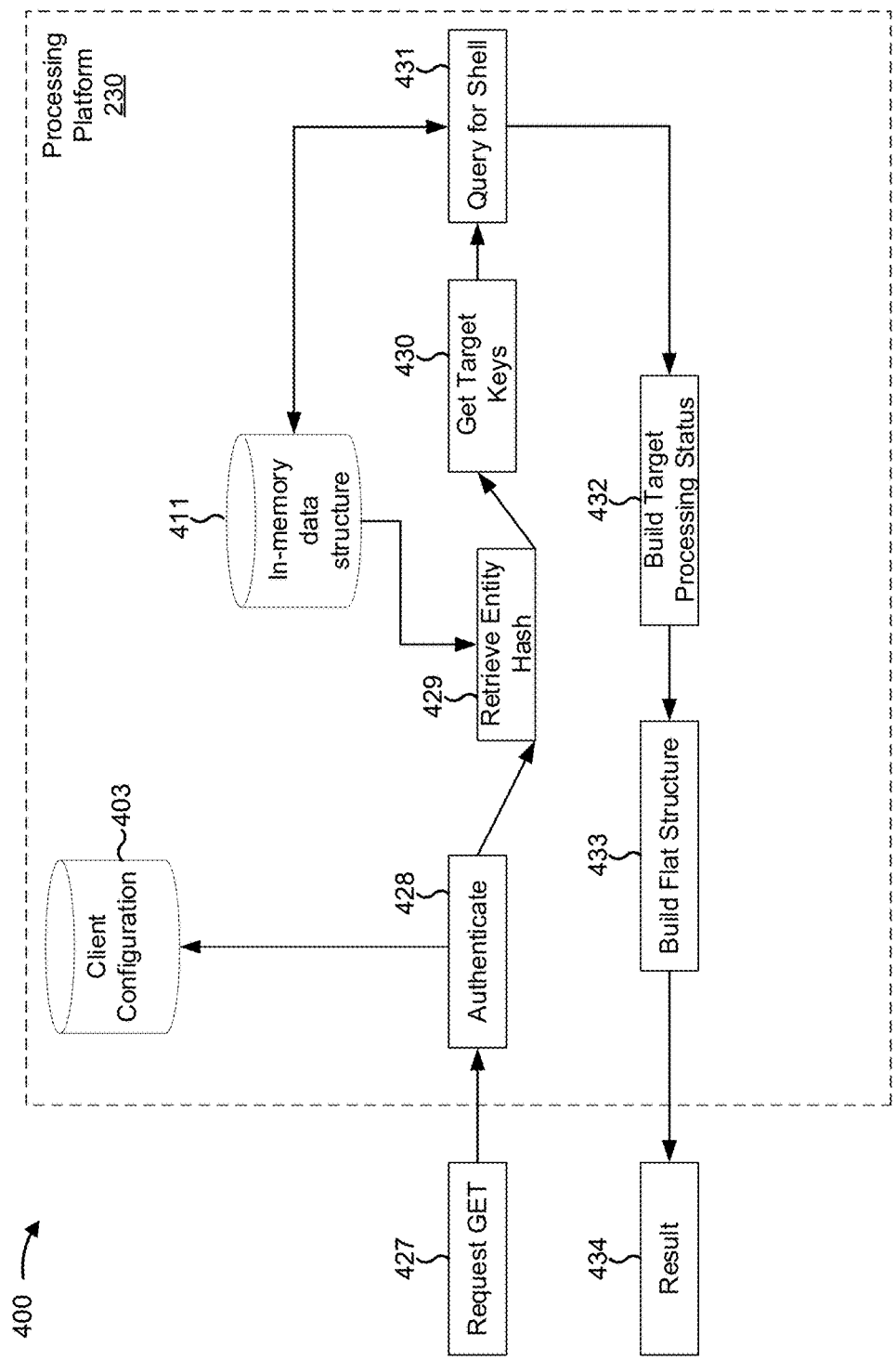

FIG. 4E shows a procedure for determining a status of a request. As shown by reference number 427, processing platform 230 may receive a query regarding a request (e.g., shown as Request GET). For example, processing platform 230 may receive the query from a user device (e.g., user device 210). As shown by reference number 428, processing platform 230 may authenticate the query using a client configuration, shown by reference number 403. As shown by reference number 429, processing platform 230 may retrieve a hash associated with an entity corresponding to the request from the in-memory data structure shown by reference number 411. For example, processing platform 230 may retrieve the hash based on an identifier that is associated with the request and that is identified by the query. As shown by reference number 430, processing platform 230 may determine target keys associated with the targets (e.g., based on a communication configuration, based on the query, and/or the like). Processing platform 230 may use the target keys to identify one or more targets to which the query relates and/or to identify one or more shells corresponding to the one or more targets.

As shown by reference number 431, processing platform 230 may query the in-memory data structure 411 for the shell corresponding to the request (e.g., based on the entity hash and/or the target keys). As shown by reference number 432, processing platform 230 may build a target processing status based on the shell. For example, processing platform 230 may determine statuses of requests and/or results associated with each target associated with the query based on the shell. As shown by reference number 433, processing platform 230 may generate a flattened structure based on the target processing status. For example, the processing platform 230 may provide the result in a particular format (e.g., after stripping formatting, after homogenizing formatting from different targets, etc.). As shown by reference number 434, processing platform 230 may provide the result (e.g., to a user device associated with the query). Thus, the user device may determine the status of a set of requests based on an identifier and using an authentication/validation process. Furthermore, processing platform 230 may enable the determination of the status as the results are obtained by dynamically updating the shells as the results are obtained.

As indicated above, FIGS. 4A-4E are provided as examples. Other examples are possible and may differ from what is provided in connection with FIGS. 4A-4E.

Figure 5:
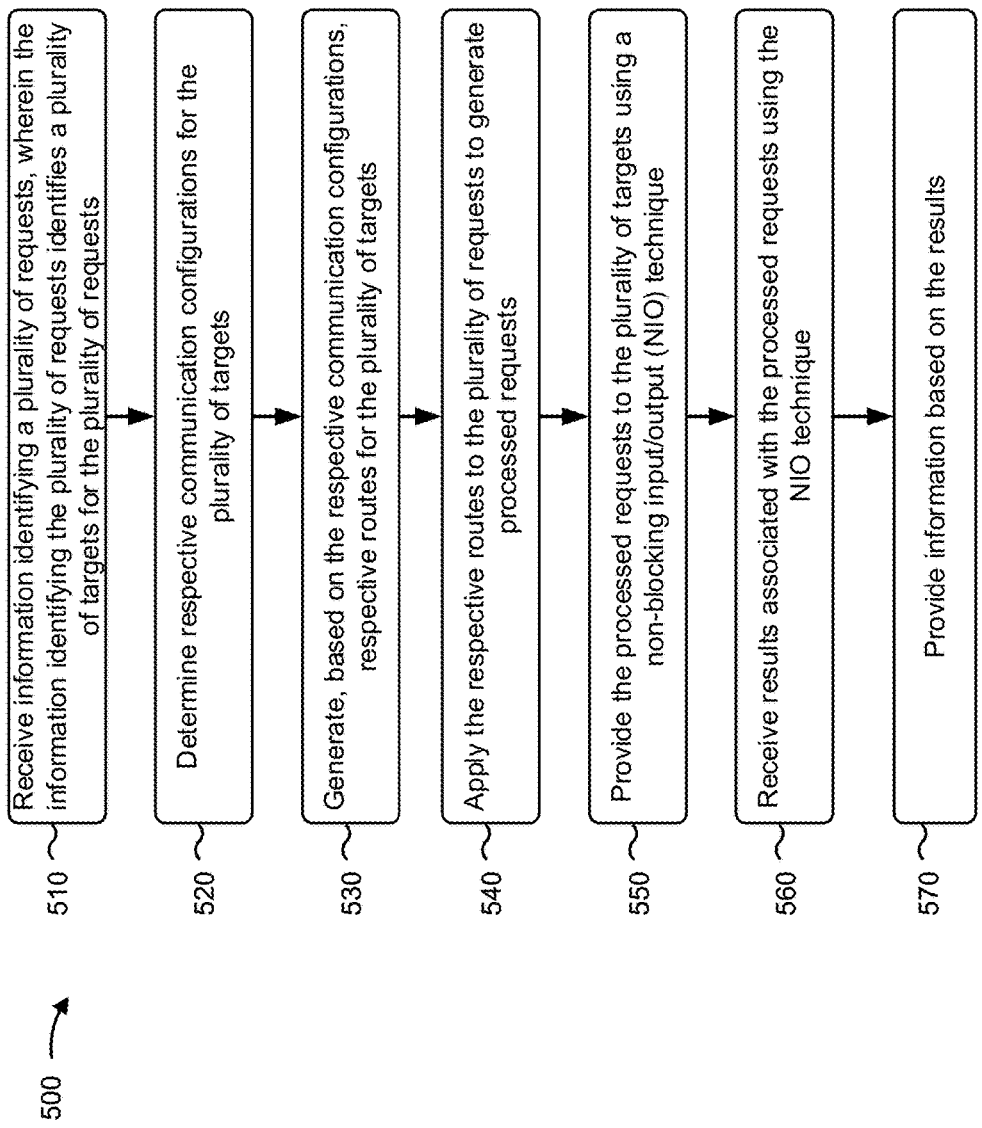
FIG. 5 is a flow chart of an example process for reactive non-blocking input and output (NIO) for target device communication.

FIG. 5 is a flow chart of an example process 500 for reactive non-blocking input and output (NIO) for target device communication. In some implementations, one or more process blocks of FIG. 5 may be performed by a platform, such as a processing platform (e.g., processing platform 230). In some implementations, one or more process blocks of FIG. 5 may be performed by another device or a group of devices separate from or including the processing platform, such as a user device (e.g., user device 210), and/or a target device (e.g., target device 220).

As shown in FIG. 5, process 500 may include receiving information identifying a plurality of requests, wherein the information identifying the plurality of requests identifies a plurality of targets for the plurality of requests (block 510). For example, the processing platform (e.g., using processor 320, memory 330, storage component 340, input component 350, communication interface 370, and/or the like) may receive information identifying a plurality of requests, as described above in connection with FIG. 1 and/or FIGS. 4A-4E. In some implementations, the information identifying the plurality of requests may identify a plurality of targets for the plurality of requests.

As further shown in FIG. 5, process 500 may include determining respective communication configurations for the plurality of targets (block 520). For example, the processing platform (e.g., using processor 320, memory 330, storage component 340, and/or the like) may determine respective communication configurations for the plurality of targets, as described above in connection with FIG. 1 and/or FIGS. 4A-4E.

As further shown in FIG. 5, process 500 may include generating, based on the respective communication configurations, respective routes for the plurality of targets, wherein a route, of the respective routes, for a target, of the plurality of targets, identifies a set of transformations to be applied to a corresponding request of the plurality of requests (block 530). For example, the processing platform (e.g., using processor 320, memory 330, storage component 340, and/or the like) may generate, based on the respective communication configurations, respective routes for the plurality of targets, as described above in connection with FIG. 1 and/or FIGS. 4A-4E. In some implementations, a route, of the respective routes, for a target, of the plurality of targets, may identify a set of transformations to be applied to a corresponding request of the plurality of requests.

As further shown in FIG. 5, process 500 may include applying the respective routes to the plurality of requests to generate processed requests (block 540). For example, the processing platform (e.g., using processor 320, memory 330, storage component 340, and/or the like) may apply the respective routes to the plurality of requests to generate processed requests, as described above in connection with FIG. 1 and/or FIGS. 4A-4E.

As further shown in FIG. 5, process 500 may include providing the processed requests to the plurality of targets using a non-blocking input/output (NIO) technique (block 550). For example, the processing platform (e.g., using processor 320, memory 330, storage component 340, output component 360, communication interface 370, and/or the like) may provide the processed requests to the plurality of targets using a NIO technique, as described above in connection with FIG. 1 and/or FIGS. 4A-4E.

As further shown in FIG. 5, process 500 may include receiving results associated with the processed requests using the NIO technique (block 560). For example, the processing platform (e.g., using processor 320, memory 330, storage component 340, input component 350, communication interface 370, and/or the like) may receive results associated with the processed requests using the NIO technique, as described above in connection with FIG. 1 and/or FIGS. 4A-4E.

As further shown in FIG. 5, process 500 may include providing information based on the results (block 570). For example, the processing platform (e.g., using processor 320, memory 330, storage component 340, output component 360, communication interface 370, and/or the like) may provide information based on the results, as described above in connection with FIG. 1 and/or FIGS. 4A-4E.

Process 500 may include additional implementations, such as any single implementation or any combination of implementations described below and/or in connection with one or more other processes described elsewhere herein.

In some implementations, when applying the respective routes, the processing platform may apply the respective routes using a parallel processing technique with a configurable number of threads. In some implementations, the processing platform may determine that a result, of the results, indicates that a processed request, of the processed requests, is associated with an error, and may perform processing of the result to determine a reason for the error, where the processing of the result is performed using an asynchronous NIO technique.

In some implementations, the NIO technique may be a reactive NIO technique. In some implementations, the reactive NIO technique may be a synchronous reactive NIO technique. In some implementations, the reactive NIO technique may be an asynchronous reactive NIO technique.

In some implementations, the set of transformations may relate to at least one of a communication channel configuration, an authentication configuration, a proxy setting, a payload transformation, an address transformation, or a format transformation for the corresponding request. In some implementations, the respective routes may be applied in a parallel and asynchronous fashion.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
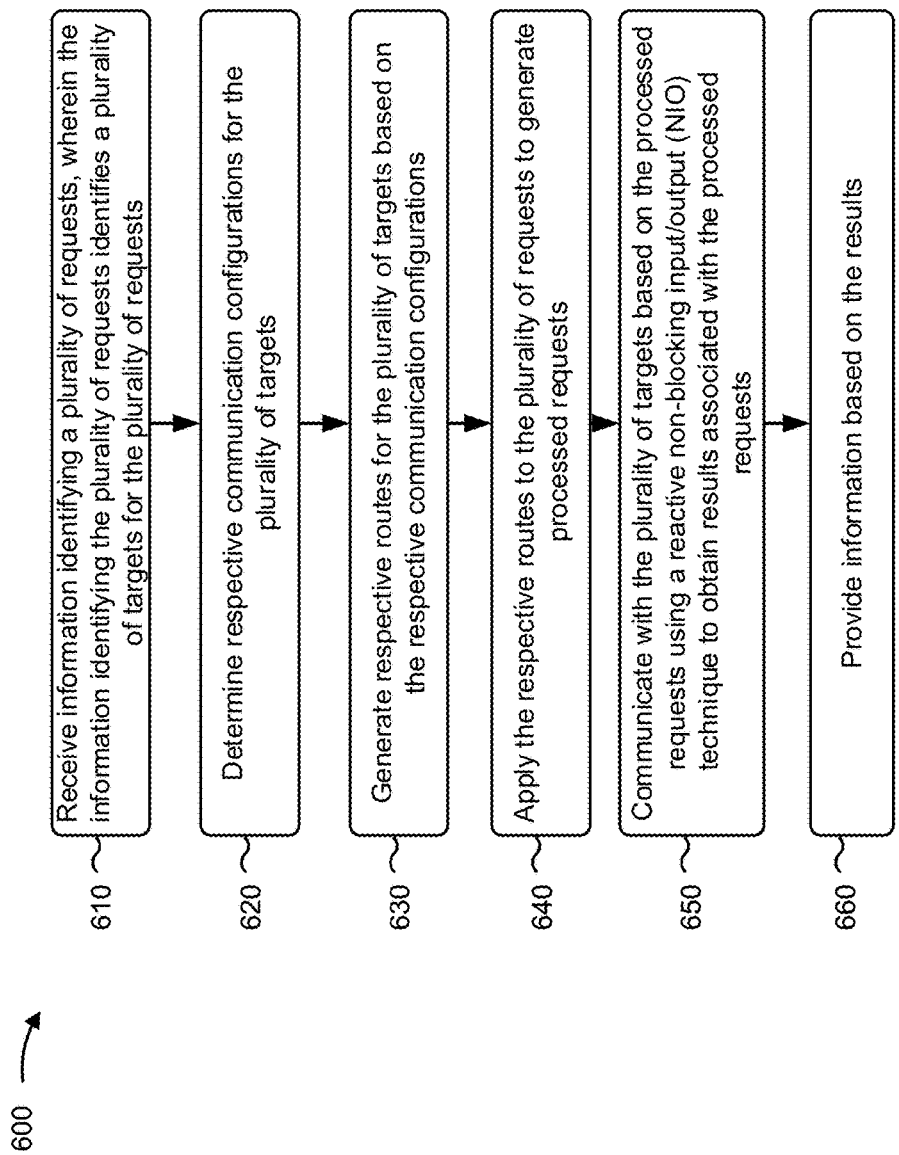
FIG. 6 is a flow chart of an example process for reactive non-blocking input and output (NIO) for target device communication.

FIG. 6 is a flow chart of an example process 600 for reactive non-blocking input and output (NIO) for target device communication. In some implementations, one or more process blocks of FIG. 6 may be performed by a platform, such as a processing platform (e.g., processing platform 230). In some implementations, one or more process blocks of FIG. 6 may be performed by another device or a group of devices separate from or including the processing platform, such as a user device (e.g., user device 210), and/or a target device (e.g., target device 220).

As shown in FIG. 6, process 600 may include receiving information identifying a plurality of requests, wherein the information identifying the plurality of requests identifies a plurality of targets for the plurality of requests (block 610). For example, the processing platform (e.g., using processor 320, memory 330, storage component 340, input component 350, communication interface 370, and/or the like) may receive information identifying a plurality of requests, as described above in connection with FIG. 1 and/or FIGS. 4A-4E. In some implementations, the information identifying the plurality of requests may identify a plurality of targets for the plurality of requests.

As further shown in FIG. 6, process 600 may include determining respective communication configurations for the plurality of targets (block 620). For example, the processing platform (e.g., using processor 320, memory 330, storage component 340, and/or the like) may determine respective communication configurations for the plurality of targets, as described above in connection with FIG. 1 and/or FIGS. 4A-4E.

As further shown in FIG. 6, process 600 may include generating respective routes for the plurality of targets based on the respective communication configurations, wherein a route, of the respective routes, for a target, of the plurality of targets, identifies a set of transformations to be applied to a corresponding request of the plurality of requests (block 630). For example, the processing platform (e.g., using processor 320, memory 330, storage component 340, and/or the like) may generate respective routes for the plurality of targets based on the respective communication configurations, as described above in connection with FIG. 1 and/or FIGS. 4A-4E. In some implementations, a route, of the respective routes, for a target, of the plurality of targets, may identify a set of transformations to be applied to a corresponding request of the plurality of requests.

As further shown in FIG. 6, process 600 may include applying the respective routes to the plurality of requests to generate processed requests (block 640). For example, the processing platform (e.g., using processor 320, memory 330, storage component 340, and/or the like) may apply the respective routes to the plurality of requests to generate processed requests, as described above in connection with FIG. 1 and/or FIGS. 4A-4E.

As further shown in FIG. 6, process 600 may include communicating with the plurality of targets based on the processed requests using a reactive non-blocking input/output (NIO) technique to obtain results associated with the processed requests (block 650). For example, the processing platform (e.g., using processor 320, memory 330, storage component 340, input component 350, output component 360, communication interface 370, and/or the like) may communicate with the plurality of targets based on the processed requests using a reactive NIO technique to obtain results associated with the processed requests, as described above in connection with FIG. 1 and/or FIGS. 4A-4E.

As further shown in FIG. 6, process 600 may include providing information based on the results (block 660). For example, the processing platform (e.g., using processor 320, memory 330, storage component 340, output component 360, communication interface 370, and/or the like) may provide information based on the results, as described above in connection with FIG. 1 and/or FIGS. 4A-4E.

Process 600 may include additional implementations, such as any single implementation or any combination of implementations described below and/or in connection with one or more other processes described elsewhere herein.

In some implementations, the processing platform may determine that a particular target, of the plurality of targets, is not associated with a set of transformations, and the processing platform, when generating the respective routes, may generate a route for the particular target using a default set of transformations.

In some implementations, the processing platform may generate an identifier for a particular request to be provided to a user device from which the particular request is received, and may provide, based on receiving the identifier, a status of the particular request or a result corresponding to the particular request.

In some implementations, the processing platform may perform authentication or validation of the plurality of requests, and the processing platform, when generating the respective routes for the plurality of targets, may selectively generate the respective routes based on a result of performing authentication or validation of the plurality of requests.

In some implementations, the plurality of requests may be associated with a payload that identifies parameters for processing the plurality of requests by the plurality of targets. In some implementations, the set of transformations may identify a payload transformation to be applied to the payload to generate a corresponding processed request of the processed requests. In some implementations, different processed requests may be associated with different portions of the payload.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
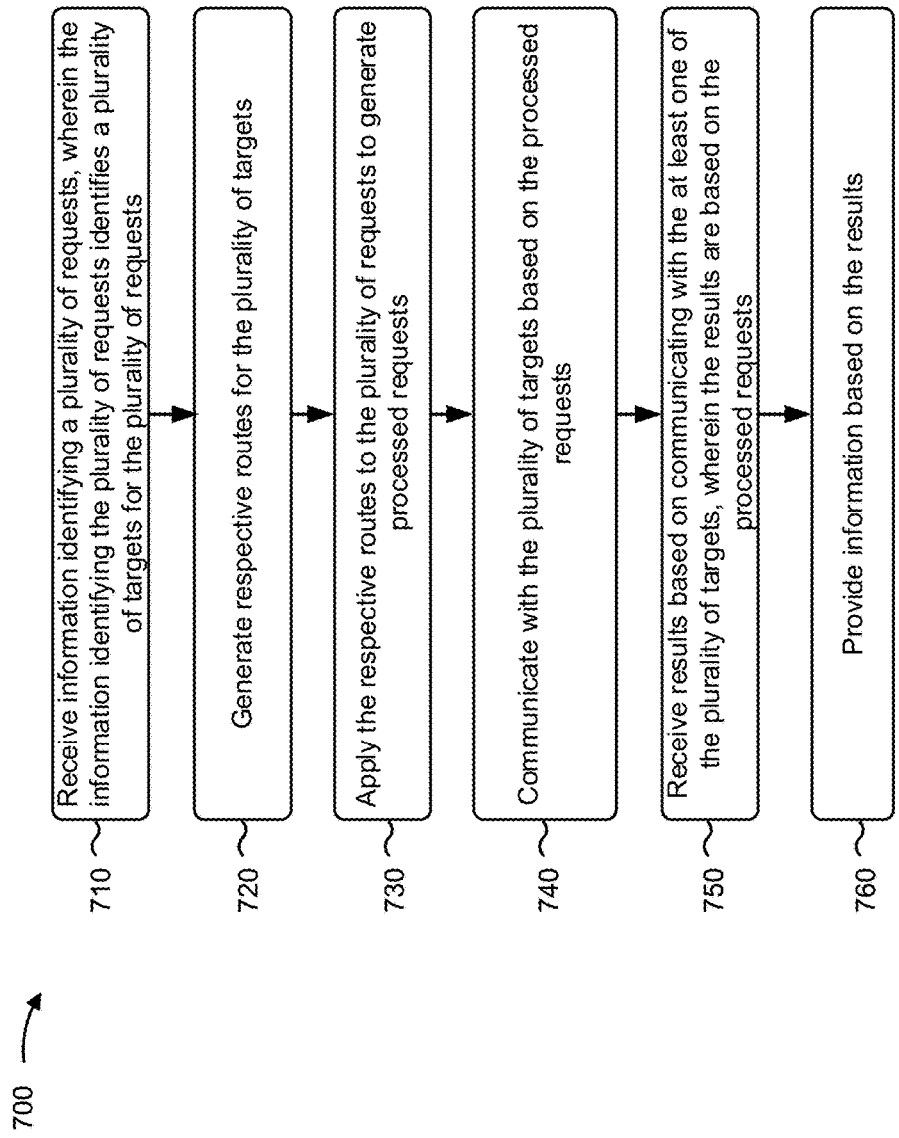
FIG. 7 is a flow chart of an example process for reactive non-blocking input and output (NIO) for target device communication.

FIG. 7 is a flow chart of an example process 700 for reactive non-blocking input and output (NIO) for target device communication. In some implementations, one or more process blocks of FIG. 7 may be performed by a platform, such as a processing platform (e.g., processing platform 230). In some implementations, one or more process blocks of FIG. 7 may be performed by another device or a group of devices separate from or including the processing platform, such as a user device (e.g., user device 210), and/or a target device (e.g., target device 220.

As shown in FIG. 7, process 700 may include receiving information identifying a plurality of requests, wherein the information identifying the plurality of requests identifies a plurality of targets for the plurality of requests (block 710). For example, the processing platform (e.g., using processor 320, memory 330, storage component 340, input component 350, communication interface 370, and/or the like) may receive information identifying a plurality of requests, as described above in connection with FIG. 1 and/or FIGS. 4A-4E. In some implementations, the information identifying the plurality of requests may identify a plurality of targets for the plurality of requests.

As further shown in FIG. 7, process 700 may include generating respective routes for the plurality of targets, wherein a route, of the respective routes, for a target, of the plurality of targets, identifies a set of transformations to be applied to a corresponding request of the plurality of requests (block 720). For example, the processing platform (e.g., using processor 320, memory 330, storage component 340, and/or the like) may generate respective routes for the plurality of targets, as described above in connection with FIG. 1 and/or FIGS. 4A-4E. In some implementations, a route, of the respective routes, for a target, of the plurality of targets, may identify a set of transformations to be applied to a corresponding request of the plurality of requests.

As further shown in FIG. 7, process 700 may include applying the respective routes to the plurality of requests to generate processed requests (block 730). For example, the processing platform (e.g., using processor 320, memory 330, storage component 340, and/or the like) may apply the respective routes to the plurality of requests to generate processed requests, as described above in connection with FIG. 1 and/or FIGS. 4A-4E.

As further shown in FIG. 7, process 700 may include communicating with at least one of the plurality of targets based on the processed requests (block 740). For example, the processing platform (e.g., using processor 320, memory 330, storage component 340, input component 350, communication interface 370, and/or the like) may communicate with at least one of the plurality of targets based on the processed requests, as described above in connection with FIG. 1 and/or FIGS. 4A-4E.

As further shown in FIG. 7, process 700 may include receiving results based on communicating with the at least one of the plurality of targets, wherein the results are based on the processed requests (block 750). For example, the processing platform (e.g., using processor 320, memory 330, storage component 340, input component 350, communication interface 370, and/or the like) may receive results based on communicating with the at least one of the plurality of targets, wherein the results are based on the processed requests, as described above in connection with FIG. 1 and/or FIGS. 4A-4E.

As further shown in FIG. 7, process 700 may include providing information based on the results (block 760). For example, the processing platform (e.g., using processor 320, memory 330, storage component 340, input component 350, communication interface 370, and/or the like) may provide information based on the results, as described above in connection with FIG. 1 and/or FIGS. 4A-4E.

Process 700 may include additional implementations, such as any single implementation or any combination of implementations described below and/or in connection with one or more other processes described elsewhere herein.

In some implementations, the processing platform may communicate with at least one of the plurality of targets using a reactive non-blocking input/output technique. In some implementations, the processing platform may receive information indicating that a procedure associated with a processed request has failed, and may determine an error handling technique for the procedure associated with the processed request based on the procedure having failed.

In some implementations, the processing platform may determine whether communication with the plurality of targets is to be performed synchronously or asynchronously, and the processing platform may, when communicating with the plurality of targets, selectively communicate with the plurality of targets synchronously or asynchronously based on the determination.

In some implementations, the processing platform may select the at least one of the plurality of targets based on the plurality of requests, and the processing platform may, when communicating with the at least one of the plurality of targets, cause the one or more processors to communicate with the at least one of the plurality of targets based on selecting the at least one of the plurality of targets.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a platform, information identifying a plurality of requests,
      wherein the information identifying the plurality of requests identifies a plurality of targets for the plurality of requests;
   determining, by the platform, respective communication configurations for the plurality of targets;
   generating, by the platform and based on the respective communication configurations, respective routes for the plurality of targets,
      wherein a route, of the respective routes, for a target, of the plurality of targets, identifies a set of transformations to be applied to a corresponding request of the plurality of requests, and
      wherein the set of transformations relates to at least one of a proxy setting, a payload transformation, or an address transformation for the corresponding request;
   applying, by the platform, the respective routes to the plurality of requests to generate processed requests,
      wherein the processed requests are generated based on applying the respective routes in a parallel and asynchronous fashion;
   aggregating, by the platform, the processed requests for concurrent provision;
   concurrently providing, by the platform, the processed requests to the plurality of targets using a non-blocking input/output (NIO) technique;
   receiving, by the platform, results associated with the processed requests using the NIO technique; and
   providing, by the platform, information based on the results.

2. The method of claim 1, wherein applying the respective routes in the parallel and asynchronous fashion further comprises:
   applying the respective routes using a parallel processing technique with a configurable number of threads.

3. The method of claim 1, further comprising:
determining that a result, of the results, indicates that a processed request, of the processed requests, is associated with an error; and
performing processing of the result to determine a reason for the error,
wherein the processing of the result is performed using an asynchronous NIO technique.

4. The method of claim 1, wherein the NIO technique is a reactive NIO technique.

5. The method of claim 4, wherein the reactive NIO technique is a synchronous reactive NIO technique.

6. The method of claim 4, wherein the reactive NIO technique is an asynchronous reactive NIO technique.

7. The method of claim 1, wherein the set of transformations relates to at least one of a communication channel configuration, an authentication configuration, or a format transformation for the corresponding request.

8. A device, comprising:
one or more memories; and
one or more processors, communicatively coupled to the one or more memories, configured to:
receive information identifying a plurality of requests,
wherein the information identifying the plurality of requests identifies a plurality of targets for the plurality of requests;
determine respective communication configurations for the plurality of targets;
generate respective routes for the plurality of targets based on the respective communication configurations,
wherein a route, of the respective routes, for a target, of the plurality of targets, identifies a set of transformations to be applied to a corresponding request of the plurality of requests, and
wherein the set of transformations relates to at least one of a proxy setting, a payload transformation, or an address transformation for the corresponding request;
apply the respective routes to the plurality of requests to generate processed requests wherein the processed requests are generated based on applying the respective routes in a parallel and asynchronous fashion;
aggregate the processed requests for concurrent provision;
communicate with the plurality of targets based on the processed requests using a reactive non-blocking input/output (NIO) technique to obtain results associated with the processed requests; and
provide information based on the results.

9. The device of claim 8, wherein the one or more processors are further configured to:
determine that a particular target, of the plurality of targets, is not associated with a set of transformations; and
wherein the one or more processors, when generating the respective routes, are further configured to:
generate a route for the particular target using a default set of transformations.

10. The device of claim 8, wherein the one or more processors are further configured to:
generate an identifier for a particular request to be provided to a user device from which the particular request is received; and
provide, based on receiving the identifier, a status of the particular request or a result corresponding to the particular request.

11. The device of claim 8, wherein the one or more processors are further configured to:
perform authentication or validation of the plurality of requests; and
wherein the one or more processors, when generating the respective routes for the plurality of targets, are further configured to:
selectively generate the respective routes based on a result of performing authentication or validation of the plurality of requests.

12. The device of claim 8, wherein the plurality of requests is associated with a payload that identifies parameters for processing the plurality of requests by the plurality of targets.

13. The device of claim 12, wherein different processed requests are associated with different portions of the payload.

14. A non-transitory computer-readable medium storing instructions, the instructions comprising:
one or more instructions that, when executed by one or more processors, cause the one or more processors to:
receive information identifying a plurality of requests,
wherein the information identifying the plurality of requests identifies a plurality of targets for the plurality of requests;
generate respective routes for the plurality of targets,
wherein a route, of the respective routes, for a target, of the plurality of targets, identifies a set of transformations to be applied to a corresponding request of the plurality of requests, and
wherein the set of transformations relates to at least one of a proxy setting, a payload transformation, or an address transformation for the corresponding request;
apply the respective routes to the plurality of requests to generate processed requests,
wherein the processed requests are generated based on applying the respective routes in a parallel and asynchronous fashion;
aggregate the processed requests for concurrent provision;
communicate with at least one of the plurality of targets based on the aggregated processed requests;
receive results based on communicating with the at least one of the plurality of targets,
wherein the results are based on the processed requests; and
provide information based on the results.

15. The non-transitory computer-readable medium of claim 14, where the one or more instructions, that cause the one or more processors to communicate with at least one of the plurality of targets, further cause the one or more processors to:
communicate with at least one of the plurality of targets using a reactive non-blocking input/output technique.

16. The non-transitory computer-readable medium of claim 14, where the one or more instructions, when executed by the one or more processors, cause the one or more processors to:
receive information indicating that a procedure associated with a processed request has failed; and
determine an error handling technique for the procedure associated with the processed request based on the procedure having failed.

17. The non-transitory computer-readable medium of claim 14, wherein the one or more instructions, when executed by the one or more processors, cause the one or more processors to:

determine whether communication with the plurality of targets is to be performed synchronously or asynchronously; and wherein the one or more instructions, that cause the one or more processors to communicate with the plurality of targets, cause the one or more processors to:

selectively communicate with the plurality of targets synchronously or asynchronously based on the determination.

18. The non-transitory computer-readable medium of claim 14, where the one or more instructions, when executed by the one or more processors, cause the one or more processors to:

select the at least one of the plurality of targets based on the plurality of requests; and wherein the one or more instructions, that cause the one or more processors to communicate with the at least one of the plurality of targets, cause the one or more processors to:

communicate with the at least one of the plurality of targets based on selecting the at least one of the plurality of targets.

19. The method of claim 1, further comprising:

determining that a result, of the results, indicates that a processed request, of the processed requests, is associated with:

an acceptance of the processed request, or a denial of the processed request.

20. The device of claim 8, wherein the one or more processors are further to:

generate a plurality of shells for the plurality of requests; and populating a respective shell, of the plurality of shells, with information indicating a status of a request, of the plurality of requests.

\* \* \* \* \*